(12) United States Patent
Edlund et al.

(10) Patent No.: US 9,705,995 B2
(45) Date of Patent: Jul. 11, 2017

(54) CAPABILITY MONITORING IN A SERVICE ORIENTED ARCHITECTURE

(71) Applicant: Axis AB, Lund (SE)

(72) Inventors: Björn Edlund, Löberöd (SE); Joachim Ståhl, Lund (SE); Joakim Roubert, Lund (SE); Mikael Ranbro, Eslöv (SE); Staffan Olsson, Furulund (SE); Ted Hartzell, Lomma (SE)

(73) Assignee: AXIS AB, Lund (SE)

( * ) Notice: Subject to any disclaimer, the term of this patent is extended or adjusted under 35 U.S.C. 154(b) by 341 days.

(21) Appl. No.: 14/218,579

(22) Filed: Mar. 18, 2014

(65) Prior Publication Data

US 2015/0271276 A1 Sep. 24, 2015

(51) Int. Cl.
*G06F 15/173* (2006.01)
*H04L 29/08* (2006.01)
*G06F 9/50* (2006.01)
*H04L 12/24* (2006.01)
*H04L 12/26* (2006.01)

(52) U.S. Cl.
CPC ............ *H04L 67/16* (2013.01); *G06F 9/5055* (2013.01); *H04L 41/06* (2013.01); *H04L 43/04* (2013.01)

(58) Field of Classification Search
CPC ......... H04L 41/06; H04L 67/16; H04L 43/04; G06F 9/5055
USPC ........................................................ 709/224
See application file for complete search history.

(56) References Cited

U.S. PATENT DOCUMENTS

| 6,185,611 | B1 | 2/2001 | Waldo et al. |
| 6,604,140 | B1 | 8/2003 | Beck et al. |
| 6,625,274 | B1* | 9/2003 | Hoffpauir ............... H04L 29/06 379/201.12 |
| 7,151,966 | B1* | 12/2006 | Baier ................... G05B 19/056 700/19 |
| 7,711,780 | B1* | 5/2010 | Durand ................. H04L 45/306 709/206 |

(Continued)

OTHER PUBLICATIONS

Chaniotakis, Emmanuel S. et al., "External service provision in telecommunications networks using open interfaces," Computer Communications, Elsevier Science Publishers BV, Amsterdam, NL, vol. 27, No. 1, Jan. 1, 2004, pp. 1-12.

(Continued)

*Primary Examiner* — Philip Chea
*Assistant Examiner* — Wing Ma
(74) *Attorney, Agent, or Firm* — Snyder, Clark, Lesch & Chung, LLP

(57) ABSTRACT

A system includes a first service registry that includes a first list of services available in a first one or more nodes of the system and a second service registry that includes a second list of services available in a second one or more nodes of the system, wherein the second service registry is connected to the first service registry. The system further includes a service manager configured to manage a capability of the system, which is realized through a set of one or more services; connect to the first service registry; receive a notification, from the first service registry, indicating a change in the second list of services included in the second service registry; and initiate deployment of a new service for the capability, or locate a deployed instance of the new service in the system, in response to receiving the notification.

20 Claims, 14 Drawing Sheets

(56) References Cited

U.S. PATENT DOCUMENTS

| | | | |
|---|---|---|---|
| 8,966,039 B1* | 2/2015 | Fultz | G06F 11/00 709/223 |
| 2003/0093554 A1* | 5/2003 | Wolfe | G06Q 20/203 709/238 |
| 2003/0110242 A1* | 6/2003 | Brown | H04L 29/06 709/222 |
| 2004/0128345 A1* | 7/2004 | Robinson | H04L 29/06 709/203 |
| 2004/0185877 A1* | 9/2004 | Asthana | G06Q 30/02 455/456.6 |
| 2004/0186897 A1* | 9/2004 | Knauerhase | H04L 67/16 709/209 |
| 2004/0199572 A1* | 10/2004 | Hunt | G06F 9/4433 709/201 |
| 2005/0021725 A1* | 1/2005 | Lobbert | H04W 48/16 709/223 |
| 2006/0177028 A1* | 8/2006 | Vermola | H04L 67/04 379/93.28 |
| 2006/0233180 A1* | 10/2006 | Serghi | H04L 29/06 370/401 |
| 2006/0235973 A1* | 10/2006 | McBride | H04L 67/20 709/226 |
| 2006/0265508 A1* | 11/2006 | Angel | H04L 29/12047 709/230 |
| 2007/0169049 A1* | 7/2007 | Gingell | G06F 8/63 717/151 |
| 2007/0192769 A1* | 8/2007 | Mimura | G06F 8/61 719/316 |
| 2007/0255711 A1* | 11/2007 | Zhou | G06F 17/30864 |
| 2008/0065683 A1* | 3/2008 | Theeten | H04L 67/16 |
| 2008/0091807 A1* | 4/2008 | Strub | H04L 41/0893 709/223 |
| 2008/0113652 A1* | 5/2008 | Liu | H04L 67/16 455/414.1 |
| 2008/0209397 A1* | 8/2008 | Mohindra | G06F 8/36 717/120 |
| 2008/0275935 A1* | 11/2008 | Mohindra | H04L 67/16 709/201 |
| 2009/0077251 A1* | 3/2009 | Brown | H04L 67/327 709/230 |
| 2009/0089078 A1* | 4/2009 | Bursey | G06Q 10/101 705/300 |
| 2009/0204612 A1* | 8/2009 | Keshavarz-Nia | H04L 67/16 |
| 2010/0017368 A1* | 1/2010 | Mao | G06F 9/465 707/E17.014 |
| 2010/0146037 A1* | 6/2010 | Little | G06F 17/30306 709/203 |
| 2010/0242053 A1* | 9/2010 | Nitzsche | G06F 9/465 719/317 |
| 2010/0262467 A1* | 10/2010 | Barnhill, Jr. | H04L 12/2809 709/223 |
| 2010/0281096 A1* | 11/2010 | Breuil | G06F 9/465 709/201 |
| 2010/0332622 A1 | 12/2010 | Carolan et al. | |
| 2011/0238795 A1* | 9/2011 | Bauer | H04L 67/2838 709/220 |
| 2011/0289512 A1* | 11/2011 | Vecera | H04L 67/1008 719/313 |
| 2012/0030680 A1 | 2/2012 | Chang et al. | |
| 2012/0036252 A1 | 2/2012 | Shi et al. | |
| 2012/0042040 A1 | 2/2012 | Bailey et al. | |
| 2012/0144295 A1* | 6/2012 | Clark | G06F 9/44505 715/255 |
| 2012/0158821 A1* | 6/2012 | Barros | G06F 17/30563 709/203 |
| 2012/0209903 A1* | 8/2012 | Salt | G06F 9/5055 709/203 |
| 2012/0233295 A1* | 9/2012 | Bauer | G06F 9/5061 709/220 |
| 2012/0239733 A1* | 9/2012 | Deprun | H04L 67/16 709/203 |
| 2012/0263103 A1* | 10/2012 | Yang | H04W 4/203 370/328 |
| 2013/0254328 A1* | 9/2013 | Inoue | H04L 29/08 709/217 |
| 2013/0304849 A1 | 11/2013 | Mehta et al. | |
| 2015/0195151 A1* | 7/2015 | Peng | H04L 41/5041 709/223 |
| 2015/0236902 A1* | 8/2015 | Alam | H04L 67/16 709/221 |

OTHER PUBLICATIONS

Toninelli, Alessandra et al., "Semantic-based discovery to support mobile context-aware service access," Computer Communications, Elsevier Science Publishers BV, Amsterdam, NL, vol. 31, No. 5, Jan. 3, 2008, pp. 935-949.

Vezzani, Roberto et al., "Event Driven Software Architecture for Multi-Camera and Distributed Surveillance Research Systems," IEEE Computer Society Conference on Computer Vision and Pattern Recognition Workshops (CVPRW), 2010, Jun. 13-18, 2010, pp. 1-8.

Callaway, Robert D. et al., "Enabling Federations of Enterprise Service Buses Using a Distributed Service Registry," Proceedings of 2nd Workshop on Services Science, Management, and Engineering. Palermo, Italy, Jun. 2, 2008, pp. 1-8.

* cited by examiner

PROPERTY TABLE 460

| | |
|---|---|
| INSTANCE ID 462 | 6529 |
| INTERFACE 464 | STORAGE SERVICE |
| SERVICE FORMAT 468 | JSON |
| TRANSPORT PROTOCOL 470 | NODE PROTOCOL |
| CPU RANKING 472 | 20/100 |
| DISK SPACE 474 | 1 TB |
| RAM 476 | 2 GB |

# CAPABILITY MONITORING IN A SERVICE ORIENTED ARCHITECTURE

FIELD

This disclosure generally relates to capability monitoring in a service oriented architecture system.

BACKGROUND

A network of devices may communicate over a network and may form part of a system that provides an array of various services. Different devices may provide different services at different times and the system may need to keep track of which services are available at which devices.

SUMMARY

According to one aspect, a system includes a first logic configured to maintain a first service registry, wherein the first service registry includes a first list of services available in a first one or more nodes of the system; a second logic configured to maintain a second service registry, wherein the second service registry includes a second list of services available in a second one or more nodes of the system, and wherein the second service registry is connected to the first service registry; and a third logic implementing a service manager configured to: manage a capability of the system, wherein the capability is realized through a set of one or more services; connect to the first service registry; receive a notification, from the first service registry, indicating a change in the second list of services included in the second service registry; and initiate deployment of a new service for the capability, or locate a deployed instance of the new service in the system, in response to receiving the notification.

Additionally, the notification may include at least one of an indication that a particular service has been removed from the second service registry; an indication that the particular service has been added to the second service registry; or an indication that a property, associated with the particular service, has changed.

Additionally, the service manager may be further configured to send a subscription request to the first service registry, wherein the subscription request includes an instruction to inform the service manager of changes involving at least one service of the set of one or more services; the first service registry may be further configured to record the subscription request; and forward the subscription request to the second service registry; and the second service registry may be further configured to send the notification based on the subscription request.

Additionally, the notification may be sent in response to a failure detected in at least one of the second one or more nodes of the system.

Additionally, the service manager may be further configured to determine that the capability cannot be fully realized, in response to receiving the notification; and send an alert to an administrator, in response to determining that the capability cannot be fully realized.

Additionally, the service manager may be further configured to locate the deployed instance of the new service available in the system; and associated the located deployed instance with the capability, in response to locating the deployed instance of the new service in the system.

Additionally, the service manager may be further configured to determine that no deployed instances of the new service are available in the system; and initiate deployment for the new service for the capability, in response to determining that no deployed instances of the new service are available in the system.

Additionally, the service manager may be further configured to receive, from a client, a request for the capability; determine that a particular one of the set of one or more services, through which the capability is realized, is not deployed in the system; select a deploying node based on information obtained from at least one of the first service registry or the second service registry; and instruct the selected deploying node to deploy the particular one of the set of one or more services, based on the received request.

Additionally, when initiating deployment of the new service for the managed capability, the service manager may be further configured to determine that the change in the second list of services included in the second service registry corresponds to at least one of the set of one or more services not being deployed; identify a particular node in which the at least one of the set of one or more services is available; and instruct the identified node to deploy the at least one of the set of one or more services in the particular node.

According to another aspect, a method, performed by a computer device, may include receiving, by the computer device, a list of services associated with realizing a capability of a system; sending, by the computer device, a subscription request for a service, in the list of services, to a first service registry; receiving, by the computer device, a first service notification, associated with the service, from a second service registry via the first service registry, wherein the first service notification includes an indication that the service is available for deployment at a first node associated with the second service registry, or an indication that the service is deployed in the system; and initiating, by the computer device, deployment of the service at the first node, or locating a deployed instance of the service in the system, in response to receiving the first service notification.

Additionally, the first service notification may include the indication that the service is available for deployment at a first node associated with the second service registry, and the method may further include initiating the deployment of the service at the first node in response to receiving the first service notification.

Additionally, the first service notification may include the indication that the service is deployed in the system, and the method may further include locating the deployed instance of the service in the system, in response to receiving the first service notification.

Additionally, the method may further include receiving a second service notification, associated with the service, from the second service registry via the first service registry, wherein the second service notification includes an indication that the service is no longer available at the first node associated with the second service registry; identifying a second node at which the service is available for deployment; and initiating deployment of the service at the second node, in response to identifying the second node.

Additionally, the method may further include receiving a second service notification, associated with the service, from the second service registry via the first service registry, wherein the second service notification includes an indication that the service is no longer available for deployment at the first node associated with the second service registry; determining that the service is not available for deployment at any other node in the system; and sending an alert to an administrator, in response to determining that the service is not available for deployment at any other node in the system.

Additionally, the method may further include receiving a second service notification, associated with the service, from the second service registry via the first service registry, wherein the second service notification includes an indication that a property associated with the service has changed; determining that the service no longer satisfies a requirement associated with the capability; ending the deployment of the service at the first node, in response to determining that the service no longer satisfies the requirement; identifying a second node at which the service is available for deployment; and initiating deployment of the service at the second node, in response to identifying the second node.

Additionally, the property associated with the service may include at least one of an available memory capacity; a processing capacity of the first node at which the service is deployed; a location of the first node; a coverage of the first node; an environmental condition associated with the first node; or a measure of signal quality associated with the first node.

Additionally, the method may further include receiving, from a requesting node in the system, a request for a particular service; determining that the particular service is not deployed in the system; selecting a deploying node based on at least one of the first service registry or the second service registry; and deploying the particular service in the selected deploying node, based on the received request.

According to another aspect, a method, performed by a computer device in a system, may include maintaining, by the computer device, a first service registry, wherein the first registry includes a first list of services available in a first one or more nodes of the system; receiving, by the computer device, a subscription request from a service manager, wherein the subscription request includes a request to receive notifications relating to changes in a particular service; recording, by the computer device, the subscription request in the first service registry; and sending, by the computer device, the subscription request to a second service registry, wherein the second service registry includes a second list of services available in a second one or more nodes of the system, wherein the second list of services includes the particular service, and wherein the second service registry is connected to the first service registry.

Additionally, the method may include receiving a service notification from the second service registry, wherein the service notification includes information relating to a change in the particular service; and forwarding the service notification to the service manager.

Additionally, the method may include determining that the subscription request is associated with a service listed in the first list of services; associating the service with the subscription request; detecting a change in the service; and sending a notification to the service manager in response to detecting the change in the service, based on associating the service with the subscription request.

DETAILED DESCRIPTION

Figure 1:
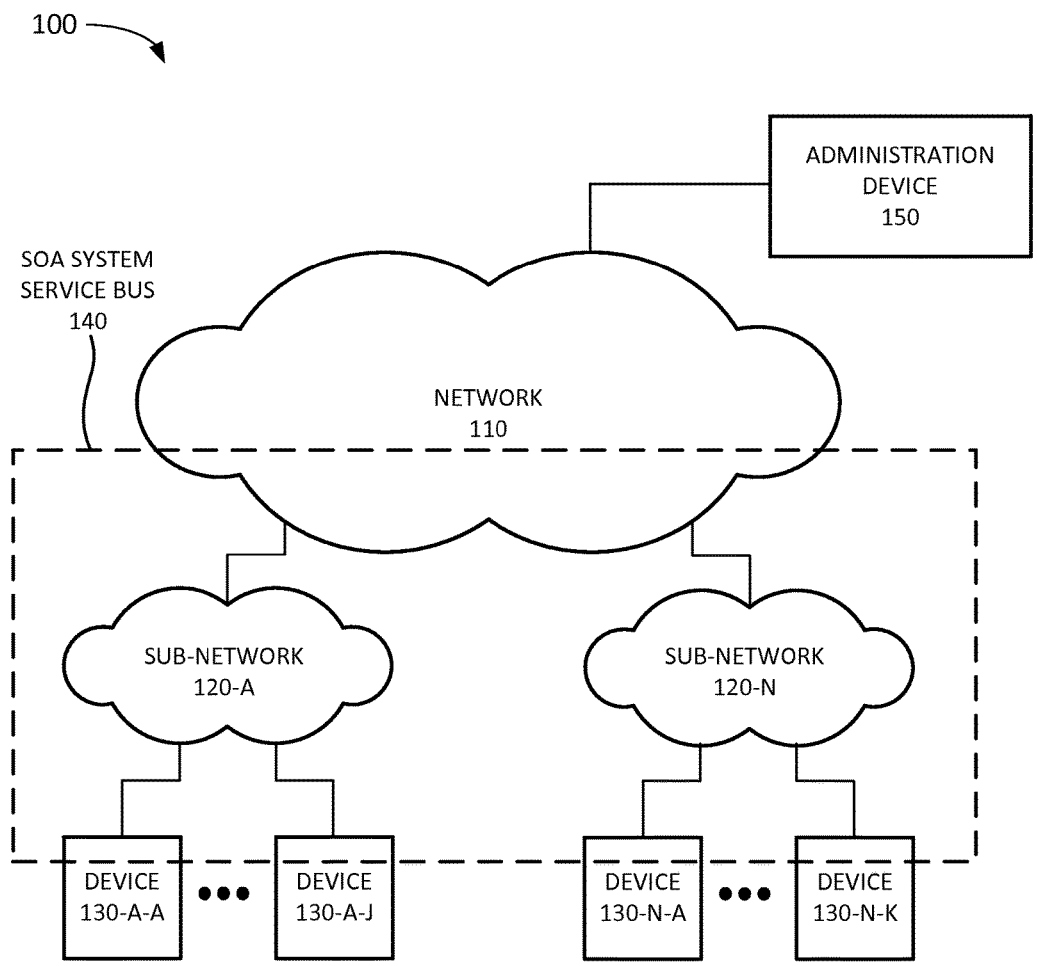
FIG. 1 is a block diagram illustrating an exemplary environment according to one or more embodiments described below.

The following detailed description refers to the accompanying drawings. The same reference numbers in different drawings identify the same or similar elements.

As noted above, a network of devices may communicate over a network and may form part of a system that provides an array of various services. Different devices may provide different services at different times and the system may need to keep track of which services are available at which devices. When a device is added, removed, or modified, for example, the configuration of the system changes. In a system with a large number of devices, this may result in frequent need for reconfiguration, which consumes system resources. Thus, keeping track of available services at different devices may be a challenging task.

A system, such as a security monitoring system, may devote significant time and resources maintaining and tracking capabilities of the nodes in the system (e.g., camera devices, storage devices, server devices, etc.). Embodiments described below relate to capability monitoring in a service oriented architecture (SOA) network. In a system based on a SOA, functionality is discretized into services. A service is a self-contained cohesive unit of functionality. Communication with a service is performed through a service interface that has a defined message format. The communication process may be independent of the implementation of the service. The service may provide end user functionality and the service interface may be designed to be understandable by business people. Furthermore, each service is independent of other services and the boundaries of the service are explicit. Thus, if one service crashes, other services may not be affected. Therefore, each service may run as a different process, for example.

In one embodiment, information about services provided by a node in the system are stored in a service registry. The service registry stores properties for each service, such as a service identifier, an operating system associated with the service, location coordinates of the node on which the service is running, processing capacity associated with the service, bandwidth capacity associated with the service, and/or other types of properties associated with the service. Not all nodes in the system may include a service registry. Thus, some service registries may store services available at other nodes in the system. Furthermore, service registries in the system may be topologically interconnected and a second service registry may be accessible through a first service registry. If the first service registry receives a search query and does not identify a match for the search query, the first service registry may forward the search query to the second service registry. Thus, to a client submitting a search query to locate a service, the service registries in the system may appear as a single distributed service registry.

The system may provide one or more capabilities. A capability of the system is defined by an administrator as a list of services along with guaranteed properties of the services. For example, a capability to stream a high definition (HD) video to a Windows OS server device from a particular location may require a video capturing service at the location, a streaming service from the particular location to a computer device running Windows OS with bandwidth capacity and Quality of Service (QoS) properties sufficient for streaming HD video, and a video playback hosting service available on the server device running Windows OS. In order to monitor various capabilities in the system, service managers may monitor properties of devices in the system to determine what kind of services are available at each device.

In one embodiment, a service manager connects to a service registry, which may be the closest service registry to the service manager, and subscribes to notifications relating to changes to services associated with a capability. For example, the service manager may send out a subscription request for each service in the capability. A service registry nearest to the service manager may receive the subscription request and may determine whether a service listed in the service registry matches the subscription request. If a match is found, the service registry sends a response back to the service manager regarding the identified service. The response may include information relating to the properties of the service. Regardless of whether a match is found, the service registry may record the subscription request and may forward the subscription request to adjacent service registries. If a match is found in an adjacent service registry, the adjacent service registry may send a response back to the first service registry, which may forward the response to the service manager. The adjacent service registry may also record the subscription request and forward the subscription request to a next adjacent service registry. Thus, the subscription request may be propagated through the network of service registries in the system and each service registry in the system may end up storing the subscription request. Thus, if a service registry does not include information about a service that matches the specifications of the subscription request, and such a service is later added, the service registry will be able to notify the service manager. If no match is found after all service registries are searched, an indication that no matches were found may be sent back to the service manager.

The service manager may receive a particular response from the service registry. As an example, the service manager may receive an indication that the service is deployed somewhere in the system. The service manager may identify the node in the system which is hosting the service and may associate the identified node with the capability. As another example, the service manager may receive an indication that the service is available for deployment in the system. In response, the service manager may identify the node in the system at which the service is available for deployment and may initiate deployment of the service at the identified node. For example, the service manager may instruct a deployment service at the node to deploy the service associated with the capability. As yet another example, the service manager may receive an indication that service is not available for deployment in the system. In response, the service manager may generate an administrator alarm to inform an administrator that the capability cannot be realized.

The service manager may continue to receive subscription notifications for the service. For example, the service registry may determine that the service has been removed, has become unavailable, and/or may determine that a property associated with the service has changed. In response, the service registry may send a subscription notification to the service manager and the service manager may act on the received subscription notification. For example, the service manager may determine that the service is no longer available at the previously identified node or that the service at the node no longer satisfies the requirements for the capability. In response, the service manager may identify another node in the system at which the service is available based on previously received subscription notifications.

Thus, the service manager may efficiently manage a capability that requires particular services and/or particular service properties in a SOA system with a large number of devices and services. The SOA system may thus be able to automatically react to changes, such as a service going offline or otherwise becoming unavailable, or a new service being added to the system.

FIG. 1 is a block diagram of an exemplary environment 100 in which the systems and/or methods described can be implemented. As shown in the embodiment of FIG. 1, environment 100 includes a network 110, sub-networks 120-A to 120-N (referred to collectively as "sub-networks 120" and individually as "sub-network 120"), devices 130-A-A to 130-N-K (referred to collectively as "devices 130" and individually as "device 130"), and administration device 150. Device 130-N-K refers to the Kth device 130 in sub-network 120-N. In this embodiment, the components in environment 100 form a service-oriented architecture (SOA) system service bus 140.

Network 110 enables sub-networks 120 and/or devices 130 to communicate with each other. Network 110 may include one or more circuit-switched networks and/or packet-switched networks. For example, in one embodiment, network 110 includes a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Sub-network 120 may include a LAN (e.g., a Layer 2 network) and/or a private network (e.g., a Layer 3 network). Sub-network 120 may interconnect one or more devices 130. For example, sub-network 120-A may interconnect devices 130-A-A to 130-A-J. Device 130 may include any device configured to communicate via SOA system service bus 140, for example.

Device 130 may include a server computer device, such as a Hypertext Preprocessor (PHP) server device, a C program server device, a Linux server device, a Windows server device, and/or another type of server device; a personal computer device, such as a desktop, laptop, tablet, a mobile communication device, and/or another type of personal computer device running Windows, Linux, Android, iOS, and/or another operating system; a monitoring device, such as a visible light camera, an infrared (IR) camera, a heat signature camera; a microphone; an alarm sensor, such as a motion sensor, a heat sensor, a pressure sensor, and/or another type of alarm sensor; a microcontroller computer device; and/or another type of computer device. While devices 130 are shown as connected to a sub-network 120, a particular device 130 may connect directly to network 110.

In one embodiment, SOA system service bus 140 is implemented between devices 130 on top of an existing network topology. SOA system service bus 140 may enable different types of devices 130, and/or devices 130 implemented using different platforms, to communicate using a service oriented architecture. SOA system service bus 140 may enable a first device 130 to request a particular service from any device 130 (e.g., itself or another device 130). Thus, a client (e.g., itself a "service" or a "client service") hosted by first device 130 may call upon a service hosted by a second device 130 (e.g., when the service is not available in first device 130). A first service (e.g., in first device 130) that requests another service (e.g., in second device 130) is referred to as a "client" or a "client service" as having initiated the request. The first service may also provide services to other services in the network, for example.

In one embodiment, a service is accessed via a standardized service interface. Each type of service may be associated with a particular service interface (e.g., a different service interface). A client requesting a service may thus communicate with a service interface and the client may be agnostic with respect to the actual implementation of the service. In other words, implementations of services communicate with each other using protocols defined by the service interfaces so that each implementation does not have to be concerned with the others' implementations. A running service implementation, associated with a particular service interface, may be referred to as a service instance. A device 130 that includes a service host (e.g., a device that hosts a service) may keep track of available service instances with a service registry (e.g., a list or database of services). SOA system service bus 140 may enable communication between devices 130 to locate a requested service by searching service registries of service hosts in devices 130.

Administration device 150 may enable an administrator to configure or otherwise manage SOA system service bus 140. For example, administration device 150 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Like network 110, sub-network 120 may include one or more circuit-switched networks and/or packet-switched networks. For example, sub-network 120 may include a LAN, a WAN, a MAN, a PSTN, an ad hoc network, an intranet, the Internet, a fiber optic-based network, a wireless network, and/or a combination of these or other types of networks.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2:
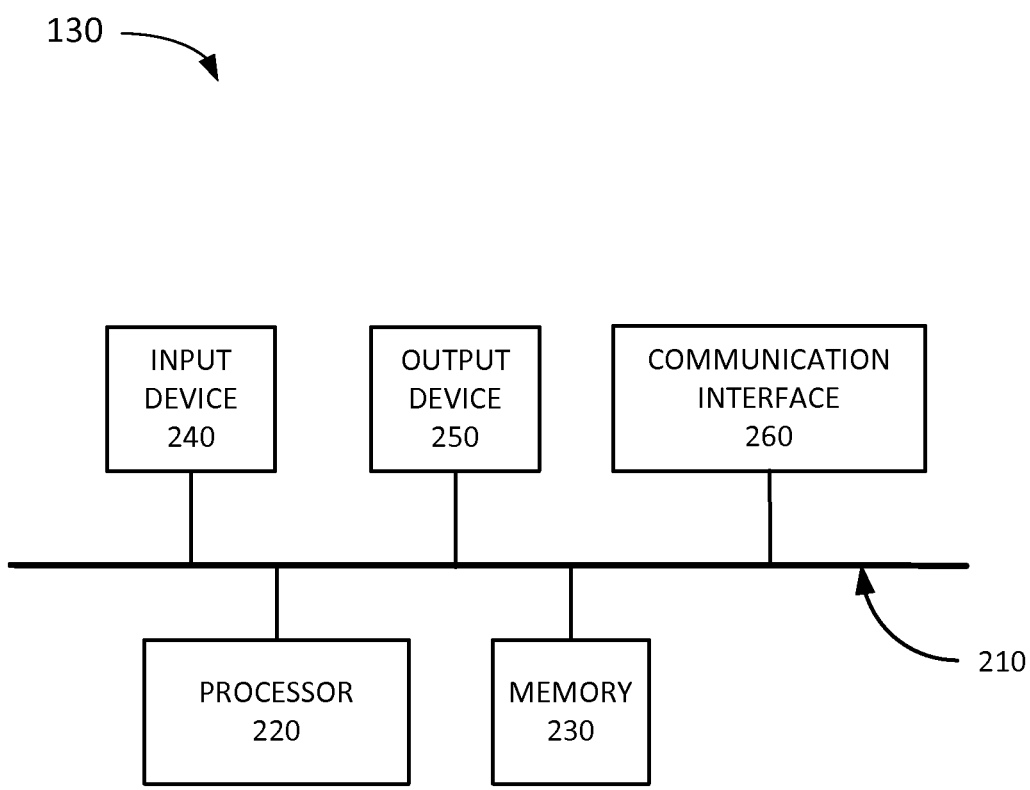
FIG. 2 is a block diagram illustrating exemplary components of a device of FIG. 1.

FIG. 2 is a block diagram illustrating exemplary components of device 130. As shown in FIG. 2, device 130 may include a bus 210, a processor 220, a memory 230, an input device 240, an output device 250, and a communication interface 260.

Bus 210 may include a path that permits communication among the components of device 130. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of volatile and/or dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 130. Input device 240 may include, for example, a keyboard, a mouse, a pen, a microphone, a remote control, an audio capture device, an image and/or video capture device, a touch-screen display, and/or another type of input device. In one embodiment, device 130 may be managed remotely and may not include input device 240. In other words, device 130 may be "headless" and may not include a keyboard, for example.

Output device 250 may output information to an operator of device 130. Output device 250 may include a display, a printer, a speaker, and/or another type of output device. For example, device 130 may include a display, which may include a liquid-crystal display (LCD) for displaying content to the customer. In one embodiment, device 130 may be managed remotely and may not include output device 250. In other words, device 130 may be "headless" and may not include a display, for example.

Communication interface 260 may include a transceiver (e.g., a transmitter and/or a receiver) that enables device 130 to communicate with other devices and/or systems. Communications interface 260 may communicate via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described below, device 130 may perform certain operations relating to management of capabilities through a service manager and/or management of subscriptions for particular services. Device 130 may perform these operations in response to processor 220 executing software instructions contained in a computer-readable medium, such as memory 230. A computer-readable medium includes a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired (e.g., fixed) circuitry may be used in place of, or in combination with, software instructions to implement processes described herein. Thus, implementations described herein are not limited to any specific combination of hardware circuitry and software.

Although FIG. 2 shows exemplary components of device 130, in other implementations, device 130 may include fewer components, different components, additional components, or differently arranged components than depicted in FIG. 2. Additionally or alternatively, one or more components of device 130 may perform one or more tasks described as performed by one or more other components of device 130. Administration device 150 may be configured similarly as device 130.

Figure 3:
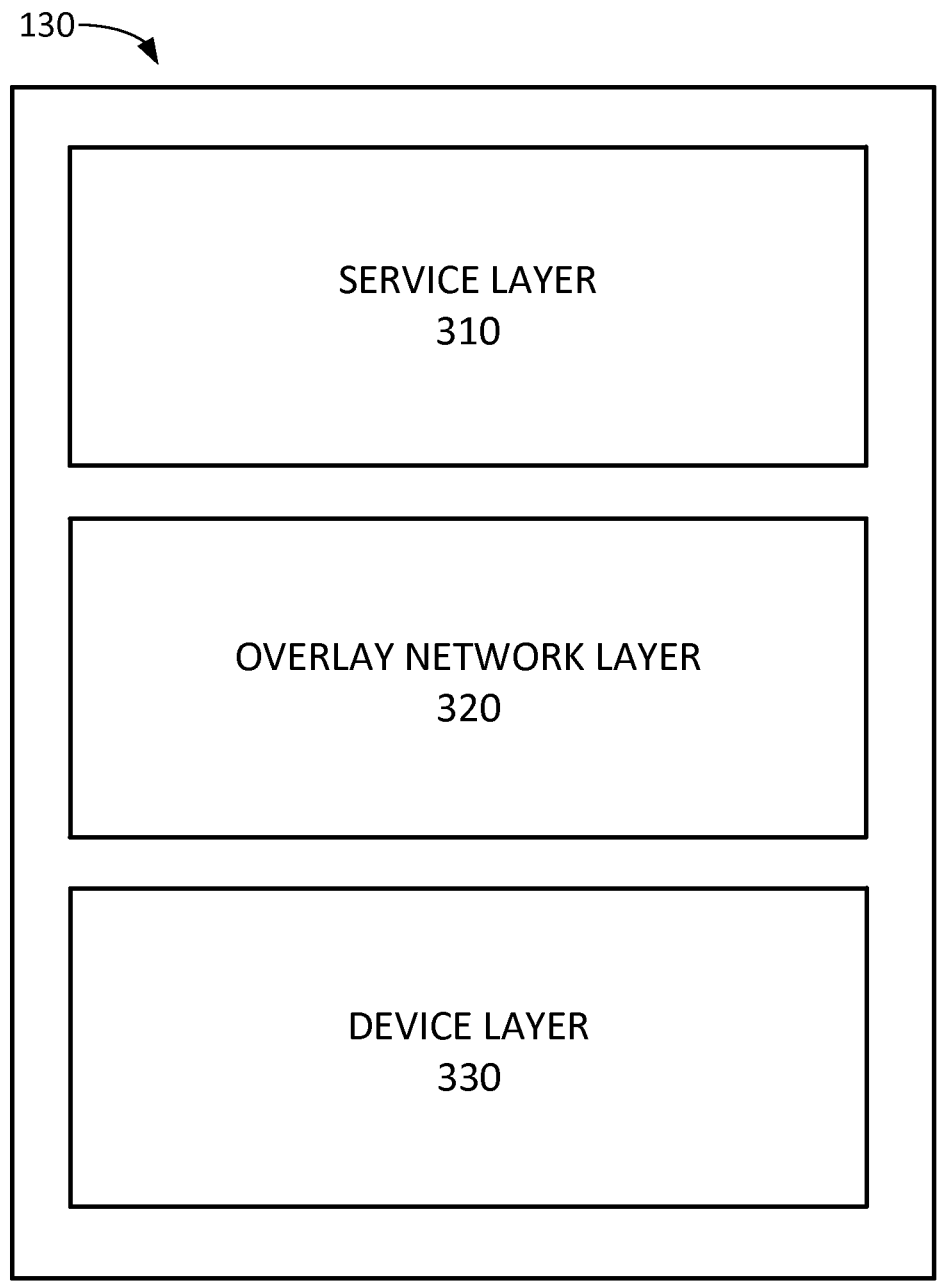
FIG. 3 is a block diagram illustrating exemplary functional layers of a device of FIG. 1.

FIG. 3 is a block diagram illustrating exemplary communication layers of device 130. The functional components of device 130 may be implemented, for example, by processor 220 executing instructions from memory 230. Additionally or alternatively, the functional components of device 130 may be implemented via hardwired (e.g., fixed) circuitry of one or more ASICs. As shown in FIG. 3, device 130 may include a service layer 310, an overlay network layer 320, and a device layer 330.

Service layer 310, in one embodiment, enables clients to search for service instances of a particular service type and enables clients to send requests to particular service instances. A service may be accessed via a standardized service interface that, in one embodiment, is agnostic to the actual implementation of the service. A service instance may be associated with explicit boundaries. In this embodiment, a particular process running on device 130, and/or particular data stored on device 130, either resides within the service instance or outside of the service instance without ambiguity. A service instance may be autonomous with respect to other service instances. For example, a particular service instance may be modified (e.g., code may be rewritten) without negatively impacting other service instances interacting with the particular service instance. A service may share a schema and/or a contract with other service instance (of the same type or of different type), but, in one embodiment, does not share the service implementation. A schema specifies the format and content of messages sent or received by the service interface. A contract specifies permissible sequences of messages sent or receive by the service interface.

One or more services may be deployed together as a bundle. A bundle may correspond to service that functions as a deployment unit in the system. A node in the system that is able to deploy a particular bundle, corresponding to a grouping of one or more services, functions as a bundle host. A bundle repository service may store a collection of bundles in the system. Thus, when service manager select to deploy a service, the service manager may need to locate a bundle host that is able to deploy a bundle associated with the service. The service manager may contact the service registry to locate the bundle repository service. The service manager may then contact the bundle repository service to identify a bundle. The service manager may select a bundle and may then search the service registry to identify a suitable bundle host that may deploy the selected bundle. The service manager may then contact the bundle host and may instruct the bundle host to deploy the bundle associated with the service.

Overlay network layer 320, in one embodiment, implements an overlay network on top of an existing network topology. Overlay network layer 320 may be responsible for routing traffic through firewalls and/or dealing with network address translation (NAT) in the underlying network topology. In one embodiment, the overlay network topology (e.g., which may be different than the underlying network topology) includes nodes organized in a tree structure. The overlay network topology logically connects the nodes. In other embodiments, the overlay network topology may include a different type of structure (e.g., a mesh topology). Each service host in a device 130 may correspond to a node in the overlay network and may be assigned a node identifier (ID). As noted above, a device 130 may include multiple service hosts and/or multiple nodes. Device 130 may be described as including one host that corresponds to one node. The nodes may be connected via the network topology, such as a routing tree, and a node may send a message to another node via the routing tree. In one embodiment, a node may send a message to another node via the underlying network topology without the message traversing the overlay network topology. Each node may store information (e.g., addresses of the underlying network, such as network 110) to reach its neighbors in the overlay network (as well as the underlying network). Overlay network layer 320 may correspond to a communication layer between the nodes and may use multiple network topologies to realize a particular function. For example, when searching service registries for a particular type of service, overlay network layer 320 may traverse edges of a tree of nodes while searching through service registries. In one embodiment, when sending a message from a first node to a second node, overlay network layer 320 may send the message directly from the first node to the second node, rather than by following edges of the tree. Overlay network layer 320 may provide node IDs to service layer 310 and service layer 310 may send messages to particular node IDs without needing to know the underlying network topology.

In one embodiment, device layer 330 performs device discovery during initial installation of SOA system service bus 140. Device layer 330 and/or overlay network layer 320 may also perform node discovery subsequent to initial installation, and/or may rediscover lost nodes that went offline and that re-join the overlay network at a later time. In one embodiment, overlay network layer 320 manages a shared secret for the overlay network, such as a certificate, that enables the nodes to verify each other's identity. Overlay network layer 320 may form a topology (e.g., a routing tree or mesh) for the overlay network based on one or more metrics of nearness. However, a message from a first node to a second node need not traverse the routing tree and may instead be sent directly from the first node to the second node. In another embodiment, the message from the first node to the second node traverses the routing tree. Furthermore, overlay network layer 320 may send multicast messages based on multicast groups. Moreover, overlay network layer 320 may provide a quality of service (QoS) guarantee to service layer 310.

While network layer 320 generally deals with "nodes," device layer 330 generally deals with "devices." Device layer 330 corresponds to the lower levels of functionality of device 130, including functionality required to communicate using the underlying network topology (e.g., network 110 and/or sub-network 120). For example, in some implementations, device layer 330 may implement Layers 1 through 6 of the Open Systems Interconnection (OSI) model (e.g. the Physical layer, Data Link layer, Network layer, Transport layer, Session layer, and Presentation layer). Implementation of these layers may include routing Ethernet frames, routing Internet Protocol (IP) packets, session management, encrypting and decrypting packets, retransmitting lost packets, etc.

Although FIG. 3 shows exemplary functional components of device 130, in other implementations, device 130 may include fewer functional components, different functional components, differently arranged functional components, or additional functional components than depicted in FIG. 3. Additionally, any one of the components (or any group of components) of device 130 may perform functions described as performed by one or more other functional components of device 130.

Figure 4A:
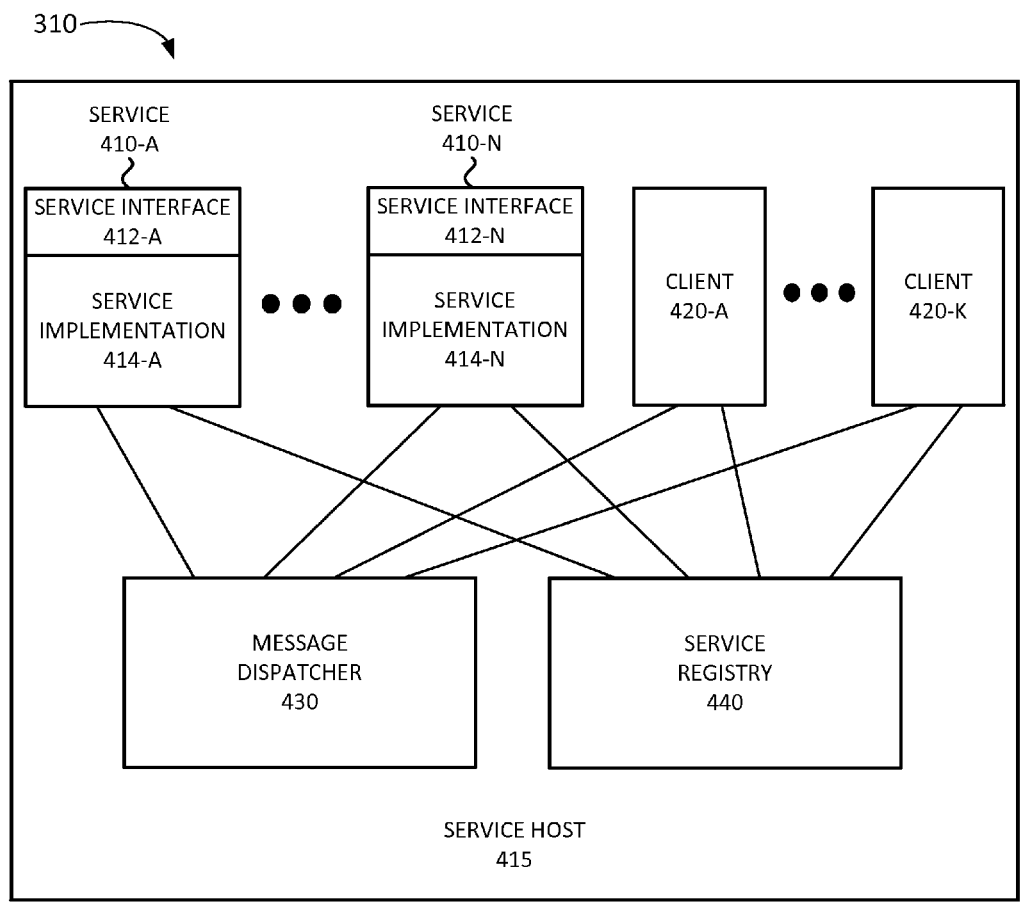
FIG. 4A is a block diagram illustrating exemplary functional components of a service layer of FIG. 3.

FIG. 4A is a block diagram illustrating exemplary functional components of service layer 310. As shown in FIG. 4A, service layer 310 includes a service host 415. Service host 415 may include one or more services 410-A to 410-N (referred to collectively as "services 410" and individually as "service 410"), one or more clients 420-A to 420-K (referred to collectively as "clients 420" and individually as "client 420"), a message dispatcher 430, and a service registry 440.

Service 410 corresponds to a service instance associated with service host 415 of service layer 310 of device 130. In one embodiment, service 410 includes a service interface 412 and a service implementation 414. Service interface 412 may include a communication protocol, such as a standardized communication protocol. In one implementation, the communication protocol includes a unique name and version. Service interface 412 may be specified using a Simple Object Access Protocol (SOAP) interface specification, a JavaScript Object Notation (JSON) interface specification, and/or another type of interface specification. Service implementation 414 includes the implementation of service 410. Service implementation 414 processes requests received via service interface 412 and/or responds to service requests through service interface 412. Service interface 412 may convert responses received from service implementation 414 into a particular format compatible with the proper protocol, which client 420 uses to exchange messages with service 410.

In one embodiment, client 420 requests a service instance of a particular service type by sending a request to service registry 440. Once a service instance is identified and selected, client 420 may send a request to the identified and selected particular service instance via message dispatcher 430. As discussed above, clients 420 may also be services 410. The term "client" or "client service" identifies the service as one that is requesting another service.

Message dispatcher 430 receives incoming messages from client 420 and directs them to service 410 that is the intended recipient of the incoming message. Furthermore, message dispatcher 430 may receive messages from a service and send the message to a particular client 420. If the destination of the incoming message is not on the same device 130 as message dispatcher 430, then the message may be forwarded to the overlay network layer 320 for forwarding to the correct device 130. Services 410 and clients 420 may function as endpoints in the overlay network implemented by overlay network layer 320. Thus, in one embodiment, overlay network layer 320 may maintain a routing table based on the routing tree of the overlay network. The routing table may include a list of next hop destinations for particular node IDs. Message dispatcher 430 may identify a next hop destination for the outgoing ID and may provide the message to overlay network layer 320 for delivery. Thus, in this embodiment, message dispatcher 430 implements a request-response messaging mechanism.

Service registry 440 maintains a list of deployed services 410 along with properties associated with the deployed services (e.g., instances of services). Exemplary components of service registry 440 are described in more detail below with reference to FIG. 4C. A service 410 may register with service registry 440 by providing service registry 440 with a description of the service (e.g., including properties of the service). Because clients 420 may also be services 410, clients 420 may also register with service registry 440.

Figure 4B:
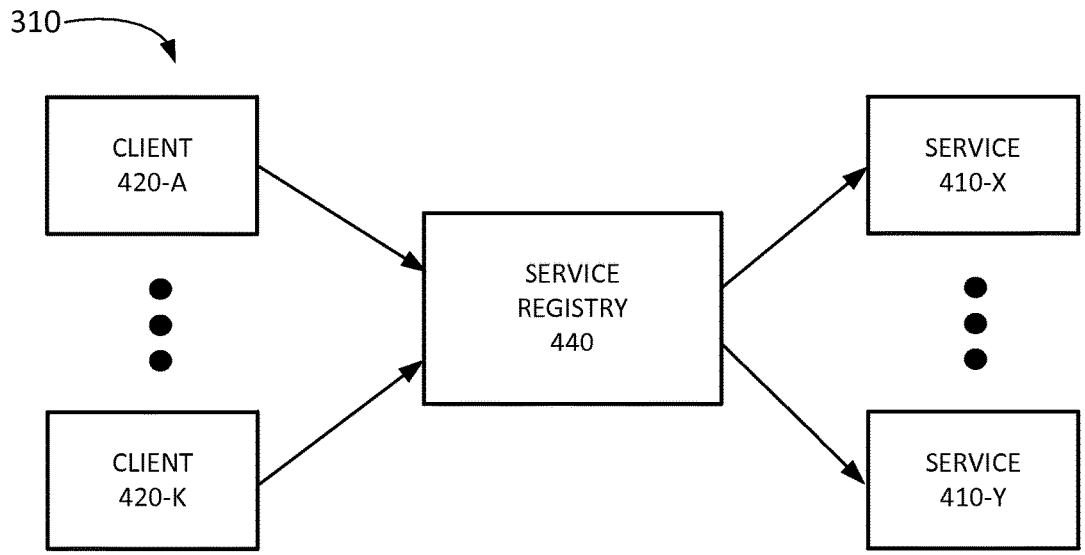
FIG. 4B is a block diagram illustrating the functionality of the service registry of FIG. 4A.

FIG. 4B is a block diagram illustrating the functionality of service registry 440. As shown in FIG. 4B, service registry 440 may receive search queries from clients 420. A search query may specify a particular service type, one or more requested properties for the particular service type, a requested number of hits, and/or one or more other parameters. Service registry 440 may identify services 410 that satisfy the search query. If the number of requested hits is not satisfied by service registry 440, service registry 440 may forward a query to another service registry 440 (e.g., an adjacent service registry 440) in the overlay network. In one embodiment, service registry 440 does not select a particular service instance based on a search query. Rather, in this embodiment, service registry 440 returns the results of the query to client 420 and client 420, which originated the query, may select a particular service instance from the search results. In another embodiment, service registry 440 selects the particular service instance based on the search query from the results of the query.

Although FIGS. 4A and 4B show exemplary functional components of service layer 310, in other implementations, service layer 310 may include fewer functional components, different functional components, differently arranged functional components, or additional functional components than depicted in FIGS. 4A and 4B. Additionally, any one of the components (or any group of components) of service layer 310 may perform functions described as performed by one or more other functional components of service layer 310.

Figure 4C:
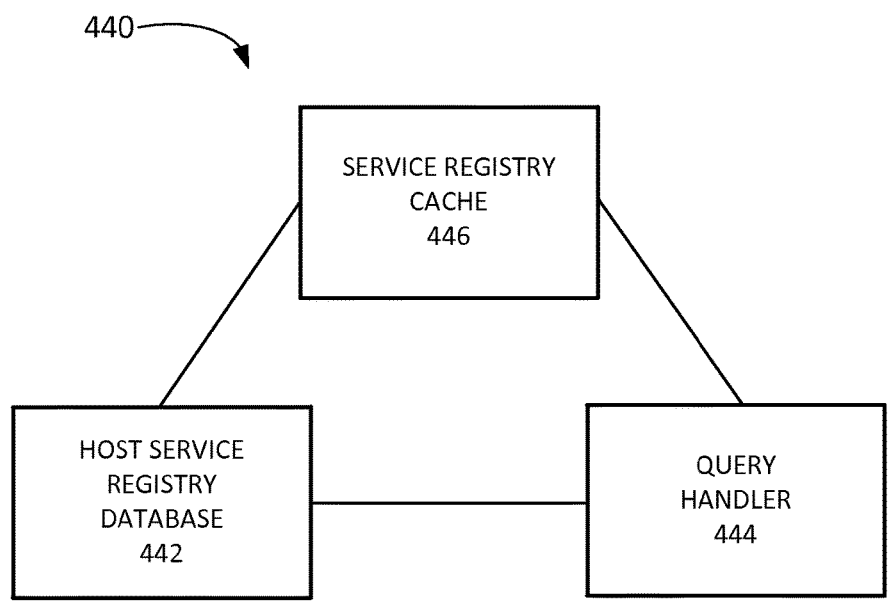
FIG. 4C is a block diagram illustrating exemplary functional components of the service registry of FIG. 4A.

FIG. 4C is a block diagram illustrating exemplary functional components of service registry 440. As shown in FIG. 4C, service registry 440 may include a host service registry database (DB) 442, a query handler 444, and a service registry cache 446.

Host service registry DB 442 may maintain a list of services 410 hosted by service host 415 and/or properties of those services. An example of a service listed in host service registry DB 442 and properties of the service is provided below with respect to FIG. 4D. Host service registry DB 442 may be populated by services 410 registering with service registry 440. Host service registry DB 442 may also expose an interface for adding or removing listed services and reading or writing properties of the services hosted by service host 415 and/or write service properties. In one embodiment, for example, host service registry DB 442 may maintain a list of services 410 hosted by a service host 415 on a different device 130. The service host 415 on the different device may list its services in a service registry on another device using the exposed interface. Furthermore, host service registry DB 442 may expose a search query service interface accessible by other service registries. Thus, other service registries may use the search query service interface to determine whether host service registry DB 442 includes an entry that satisfies a particular query. In one embodiment, services listed in host service registry DB 442 may expire (e.g., be removed from DB 442 after a period of time if not refreshed) to help prevent DB 442 from storing outdated information.

Host service registry 442 may receive a subscription request from a service manager, may store the subscription request, and may forward the subscription request to all adjacent service registries. Host service registry 442 may determine whether a service matches the subscription request and may send a subscription notification back to a service manager that originated the subscription request if a matching service is identified. Furthermore, host service registry 442 may determine whether an update to a stored service is associated with a subscription. If an update is associated with a subscription, host service registry 442 may send a subscription notification to the service manager (or another type of service) that originated the subscription request for the associated subscription.

Query handler 444 may handle queries received from client 420. In one embodiment, given a query, query handler 444 first searches the local host service registry DB 442, followed by service registry cache 446. Query handler 444 may issue a call to other service registries if the query has not been satisfied, for example. Service registry cache 446 may store data from remote service registries 440. Each service host 415 may maintain a local service registry 440 and services 410 that register with service host 415 are registered in the local service registry 440. A query from client 420 that cannot be satisfied by the local service registry 440 may be sent to one or more neighboring service hosts 415 to see if the neighboring service hosts 415 have service registries 440 that include services that satisfy the query. The remote service registry 440 may return results of the query back to the local service registry 440 and the results may be stored in service registry cache 446. In some implementations, parent nodes may cache data for their children nodes, while children nodes may not cache data for their parent nodes. In one embodiment, services listed in service registry cache 446 may expire (e.g., be removed from cache 446 after a period of time if not refreshed) to help prevent cache 446 from storing outdated information.

Although FIG. 4C shows exemplary functional components of service registry 440, in other implementations, service registry 440 may include fewer functional components, different functional components, differently arranged functional components, or additional functional components than depicted in FIG. 4C. Additionally, any one of the components (or any group of components) of service registry 440 may perform functions described as performed by one or more other functional components of service registry 440.

Figure 4D:
FIG. 4D is a block diagram of an exemplary property table for a particular service that may be stored by the service registry of FIG. 4A.

FIG. 4D is a block diagram of an exemplary property table 460 for a particular service that may be stored by service registry 440. In one embodiment, an instance of a service (e.g., each instance) is associated with a property table, such as table 460. Host service registry database DB 442 may store a property table for each service registered with the corresponding service registry 440. In one embodiment, as described above, the information stored in any one service registry DB 442 may be different than information stored in other service registry databases. Exemplary property table 460 includes eight fields: ID field 462, interface field 464, service format field 468, transport protocol field 470, CPU ranking 472, disk space field 474, and RAM field 476.

Instance ID field 462 uniquely defines the instance of the particular service. The instance ID (possibly along with the node ID) may uniquely identify the service instance from any other services (of the same type or different type) in the network. In one embodiment, instance ID field 462 is an integer. In table 460, the instance ID is 6529 as an example.

Interface field 464 identifies the name of the interface of the service. In this case, the interface field 464 may also identify the type of service by the type of interface. For example, table 460 identifies the interface as "STORAGE SERVICE". Service format field 468 identifies the format used by the instance of the service. As an example, table 460 identifies the service format as "JSON". Transport protocol field 470 identifies the protocol used by the instance of the service. As an example, table 460 identifies the service format as "NODE PROTOCOL".

CPU ranking field 472 identifies the performance of the CPU associated with the service instance. In one embodiment, a scale is used (e.g., 1 to 100). Table 460 identifies the CPU ranking as 20/100 for the service in CPU ranking field 742. RAM field 476 identifies the amount of random-access memory available to the service. Table 460 identifies the available RAM as 2 GB in field 476.

Although FIG. 4D shows exemplary components of property table 460, in other implementations, property table 460 may include fewer components, different components, differently arranged components, or additional components than depicted in FIG. 4D.

Figure 5A:
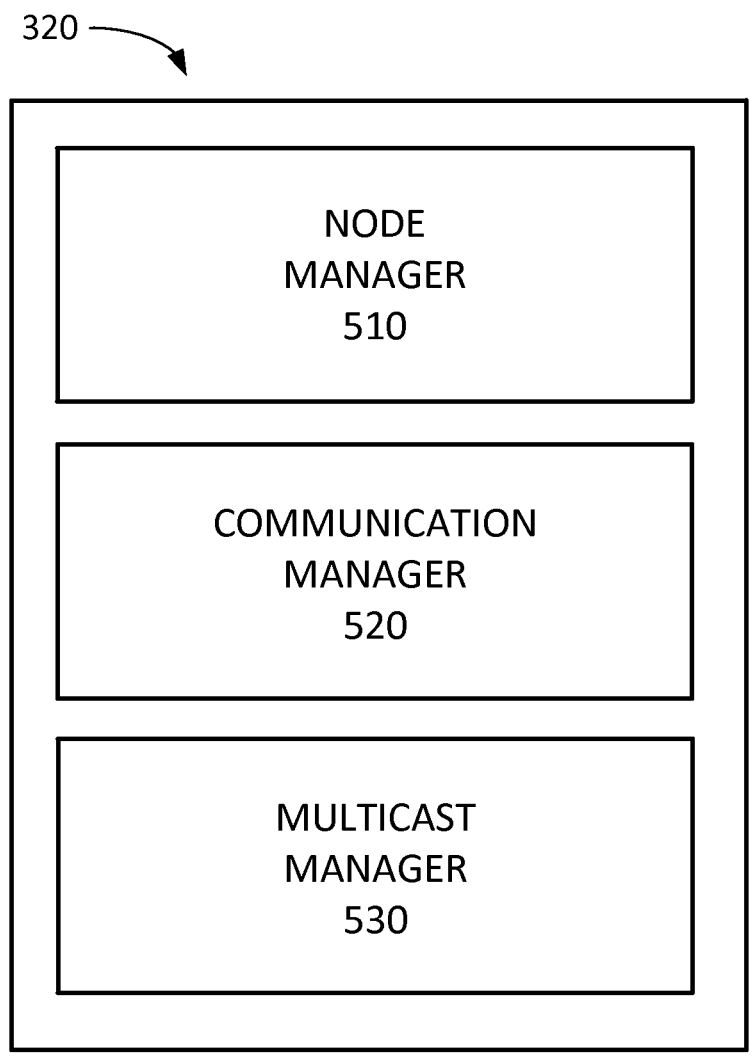
FIG. 5A is a block diagram illustrating functional components of an overlay network layer of FIG. 3.

FIG. 5A is a block diagram illustrating functional components of overlay network layer 320. As shown in FIG. 5A, overlay network layer 320 may include a node manager 510, a communication manager 520, and a multicast manager 530.

Node manager 510 may provide node information, such as a node ID, to other nodes in the overlay network. Furthermore, node manager 510 may maintain a list of nodes in the overlay network. Node manager 510 may perform node discovery to identify new nodes added to the overlay network and/or to rediscover lost nodes that have re-joined the overlay network. Node manager 510 may also determine the topology of the network, as described below (e.g., which nodes are nearest other nodes).

Communication manager 520 may enable nodes to communicate with each other. Communication manager 520 may implement a mechanism to traverse the tree of the overlay network. Tree traversal may be performed in connection with search queries of service registries or when a direct communication method to another node is not available. Furthermore, communication manager 520 may implement a direct communication method that may enable particular nodes of the overlay network to communicate directly without having to traverse the tree of the overlay network.

Multicast manager 530 may implement a multicast mechanism. The multicast mechanism may be used to send a message to the members of a multicast group (e.g., all the members). Furthermore, the multicast mechanism may be used to implement a subscribe-notify messaging pattern. Thus, an event associated with a particular service instance may be used to trigger a message sent to the nodes that have subscribed to messages from the particular service instance. Multicast manager 530 may include an application layer multicast manager or a multicast manager from lower OSI layers.

Although FIG. 5A shows exemplary functional components of overlay network layer 320, in other implementations, overlay network layer 320 may include fewer functional components, different functional components, differently arranged functional components, or additional functional components than depicted in FIG. 5A. Additionally, any one of the components (or any group of components) of overlay network layer 320 may perform functions described as performed by one or more other functional components of overlay network layer 320.

Figure 5B:
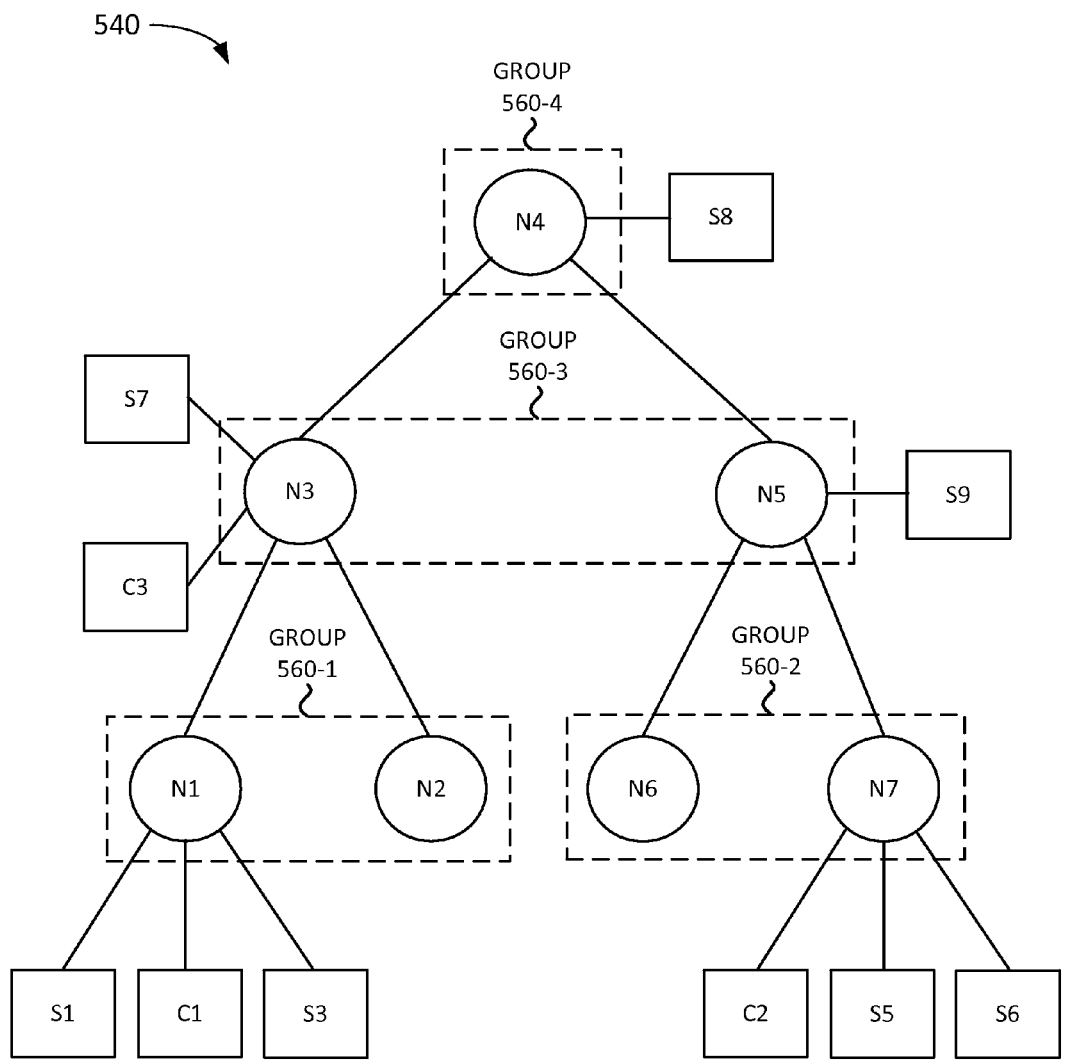
FIG. 5B is a block diagram of a tree of an exemplary functional overlay network.

FIG. 5B is a block diagram of an exemplary topology of an overlay network 540. As shown in the example of FIG. 5B, overlay network 540 includes nodes N1 to N7. Nodes N1 and N2 are in multicast group 560-1. Node N1 includes service endpoints S1 and S3 and client endpoint C1. Node N3 is the parent node to nodes N1 and N2. Node N3 includes a service endpoint S7 and a client endpoint C3.

Nodes N6 and N7 are in multicast group 560-2 and node N7 includes client endpoint C2 and service endpoints S5 and S6. Node N5 is the parent node to nodes N6 and N7 and includes service endpoint S9. Nodes N3 and N5 are in multicast group 560-3. Node N4 is the parent node to nodes N3 and N5 and is the root node of overlay network 540. Furthermore, node N4 is in multicast group 560-4 and includes service endpoint S8. Although parent nodes in the topology of network 540 have two child nodes, in other implementations, parent nodes may have more than two child nodes.

Assuming each service endpoint is associated with a service registry 440, a search query may traverse overlay functional network 540 as follows. Assume service endpoint S7 in node N3 executes a search query to identify a particular service included in service endpoint S1 and service endpoint S5 (i.e. for which S1 and S5 are a match). Service endpoint S7 may send the search query to its local service registry, which may result in no matches in the search query. The local service registry may then identify adjacent service registries in the overlay network, which may include a service registry in node N1 and a service registry in node N4 (node N2 may not include a service registry, since there are no service endpoints associated with node N2). The service registry in node N1 may return a hit identifying service endpoint S1. The service registry in node N4 may return no hits and may forward the search query to its adjacent service registries, which in this case include service registries in nodes N3 and N5. However, since the service registry in node N3 has already processed the search, the search query may only be sent to the service registry in node N5. The service registry at node N5 may come up with no hits and may forward the search query to a service registry at node N7. Node N7 may identify service endpoint S5 as a hit and may return the results of the search query to node N4 and node N4 may forward the search results to service endpoint S7 in node N3.

Service endpoint S7 may then select communicate with either service endpoint S1 at node N1 or service endpoint S5 at node N7. In some implementations, service endpoint S7 may send a message to service endpoint S5 via nodes N4 and N5. In other implementations, service endpoint S7 may send a message to service endpoint S5 by communicating directly with node N7.

As another example, service endpoint S7 may only require the first match to the search query. Nodes may forward search queries to other nodes in a priority order that prioritizes nodes that are further down the tree. Thus, node N3 would forward the search query to nodes N1 and N2, before sending the search query to node N4, since nodes N1 and N2 are further down the tree (i.e., are children of node N3), while node N4 is further up the tree (i.e., is a parent of node N3). Since node N1 identifies a match for the search query, and service endpoint S7 only requires one match, the search may terminate before the search query is sent to node N4.

Figure 6:
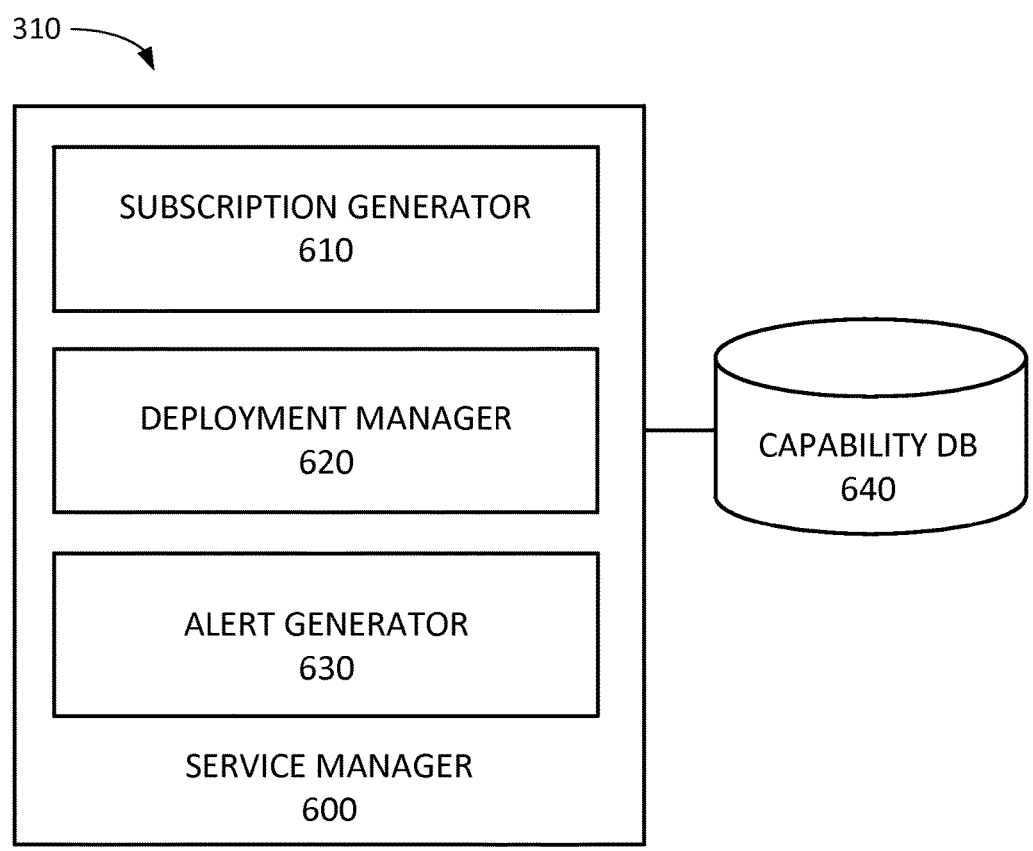
FIG. 6 is a block diagram illustrating functional components of a service manager.

FIG. 6 is a block diagram illustrating functional components of a service manager 600. Service manager 600 may be configured to manage one or more capabilities. As shown in FIG. 6, service manager 600 may include a subscription generator 610, a deployment manager 620, and alert generator 630, and be associated with capability database (DB) 640.

Subscription generator 610 may generate subscription requests for services associated with a capability. Furthermore, subscription generator 610 may receive subscription notifications from service registries 440 and may update capability DB 640 based on the received subscription notifications. Deployment manager 620 may initiate deployment of one or more services. For example, if subscription generator 610 receives a subscription notification indicating that a service, associated with a capability managed by service manager 600, is available for deployment at a node, deployment manager 620 may initiate deployment of the service at the node by instructing a deployment service (e.g., a bundle host) at the node to deploy the service.

Alert generator 630 may generate an alert for an administrator. For example, if subscription generator 610 receives an indication that a particular service, required to realize a capability, is not available for deployment in the system, alert generator 630 may generate an alert and may send the alert to administration device 150.

Capability DB 640 may store information relating to capabilities managed by service manager 600. Exemplary information that may be stored in capability DB 640 is described below with reference to FIG. 7B.

As an example, service manager 600 may correspond to a service manager for a transcoding capability that converts a video file, or a video stream, from one encoding format to another encoding format. A transcoding capability may require a transcoding service for each particular conversion type (e.g, a Moving Picture Experts Group 4 (MPEG-4) to High Efficiency Video Coding (HVEC) transcoding service, a MPEG-4 to MPEG-2 transcoding service, etc.).

As another example, service manager 600 may correspond to a service manager for a people counting capability. A people counting capability may count the number of people that pass through a particular location during a particular time period. A people counting capability may require a set of services that includes a video stream capturing service for the particular location, a storage service that stored a captured video stream, a feature detection service that processes a stored video stream to extract features, a people detection service that processes the extracted features to identify people in images of the stored video stream, and a people counting reporting service that generates a user interface to report the number of counted people at the particular location during the time period.

As yet another example, service manager 600 may correspond to a service manager for streaming a video signal from a particular location to a storage location for a particular operating system. The storage capability may require a first service to capture a video of the particular location, a second service stream the captured video signal to a storage device, and a third service to store the captured video signal in a device using the particular operating system.

Although FIG. 6 shows exemplary functional components of service manager 600, in other implementations, service manager 600 may include fewer functional components, different functional components, differently arranged functional components, or additional functional components than depicted in FIG. 6. Additionally, any one of the components (or any group of components) of service manager 600 may perform functions described as performed by one or more other functional components of service manager 600.

Figure 7A:
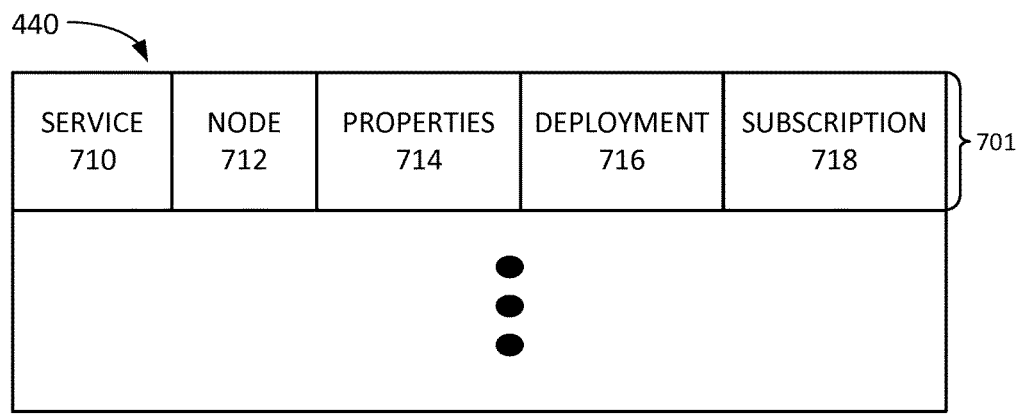
FIG. 7A is a block diagram illustrating components that may be stored in the service registry of FIG. 4A.

FIG. 7A is a block diagram illustrating components that may be stored in service registry 440. As shown in FIG. 7A, service registry 440 may include one or more service entries 701. Each service entry 401 may store information relating to a particular service hosted by service host associated with service registry 440. Service entry 401 may include a service field 710, node field 712, properties field 714, deployment field 716, and subscription field 718.

Service field 710 may identify a particular service associated with the service entry. For example, service field 710 may identify a service interface associated with the particular service. Node Field 712 may identify a particular node (e.g., device 130) associated with the particular service. In some implementations, a first node may maintain a service registry for a second node and may identify services associated with the second node in the service registry. Properties field 714 may store information identifying properties associated with the particular service. For example, properties field 714 may include information identifying a location associated with the service, an operating system associated with the service, a processing load associated with the service, a bandwidth capacity associated with the service, a memory capacity associated with the service, a storage capacity associated with the service, a sub-network and/or domain associated with the service, a security level associated with the service, a codec type associated with the service, and/or another type of property. In some embodiments, properties field 714 may include property table 460.

Deployment field 716 may include information identifying whether the service is deployed or whether the service is available for deployment. Subscription field 718 may include information identifying subscriptions associated with the service. A service may be associated with one or more subscriptions. The subscription information may, for example, identify a particular service manager 600 (e.g., based on a node ID) that has subscribed to notifications about changes to the service. Thus, if the service is deployed, added, removed, made unavailable, if a property of the service changes, and/or if another type of change is detected, a notification may be sent to service manager 600.

Although FIG. 7A shows exemplary components of service registry 440, in other implementations, service registry 440 may include fewer components, different components, differently arranged components, or additional components than depicted in FIG. 7A.

Figure 7B:
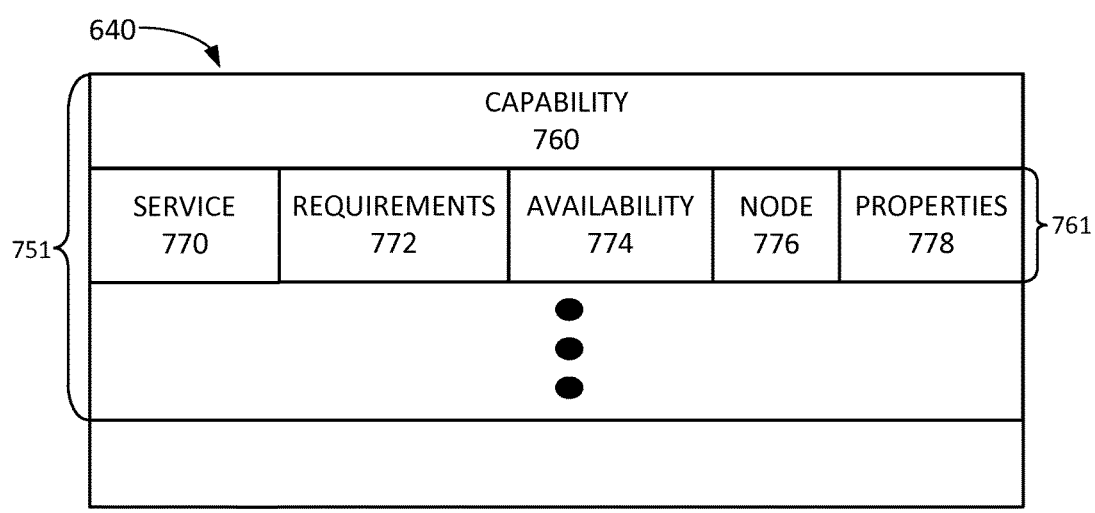
FIG. 7B is a block diagram illustrating components that may be stored in the capabilities database of FIG. 6.

FIG. 7B is a block diagram illustrating components that may be stored in the capabilities DB 640. Capabilities DB 640 may store one or more capability records 751. Each capability record 751 may store information relating to a particular capability managed by service manager 600. Each capability record 751 may include one or more service entries 761. Each service entry 761 may store information relating a particular service associated with the particular capability. Service entry 761 may include a service field 770, a requirements field 772, an availability field 774, a node field 776, and a properties field 778.

Service field 770 may identify the particular service by identifying, for example, the service interface for the particular service. Requirements field 772 may store information identifying one or more requirements associated with the particular service. As an example, the capability may require a particular number of deployed instances of the service. As another example, the capability may require that a particular number of instances be available for deployment. As yet another example, the capability may require that the service include a particular property (e.g., a particular storage capacity, a particular bandwidth capacity, a particular location, a particular OS, etc.).

Availability field 774 may include information identifying the availability of the particular service. For example, availability field 774 may identify whether the service is deployed or available for deployment. Furthermore, in some implementations, availability field 774 may identify the number of deployed instances or number of instances available for deployment. Node field 776 may store information identifying one or more nodes at which the particular service is deployed or is available for deployment. For each subscription notification received by service manager 600, service manager 600 may add a node to (or remove a node from) node field 776.

Properties field 778 may store information relating to properties of deployed instances, or of instances available for deployment, of the particular service, which are associated with the capability. Service manager 600 may monitor the information stored in properties field 778 to determine whether the properties satisfy the requirements for the capability. If the properties do not satisfy the requirements for the capability, service manager 600 may attempt to identify another deployed service instance, or a service instance available for deployment, which does satisfy the requirements.

Although FIG. 7B shows exemplary components of capabilities DB 640, in other implementations, capabilities DB 640 may include fewer components, different components, differently arranged components, or additional components than depicted in FIG. 7B.

Figure 8:
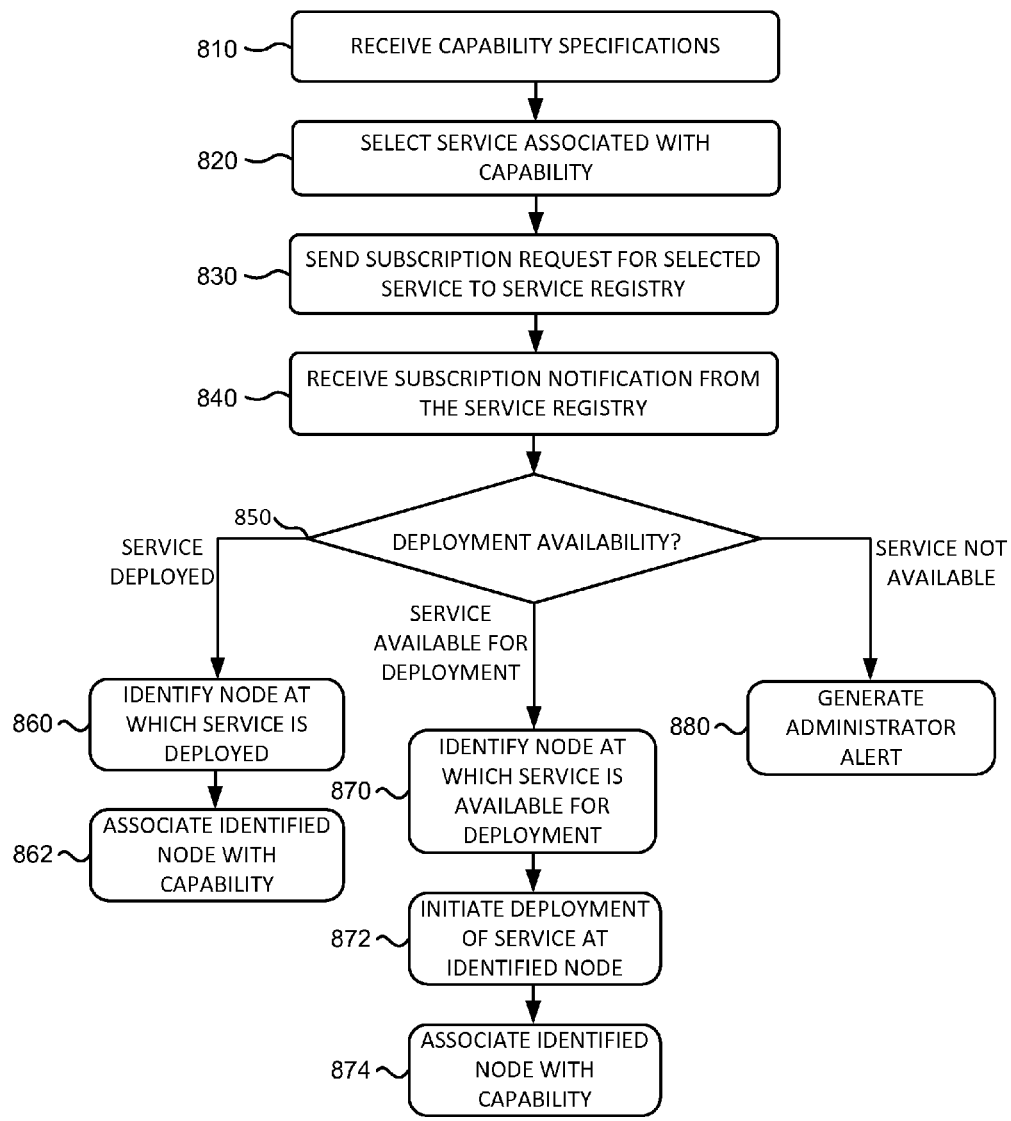
FIG. 8 is a flowchart of a first process for managing a capability according to an implementation described herein.

FIG. 8 is a flowchart of a first process for managing a capability according to an implementation described herein. In one implementation, the process of FIG. 8 may be performed by service manager 600 in device 130. In other implementations, some or all of the process of FIG. 8 may be performed by another device or a group of devices separate from and/or including service manager 600.

The process of FIG. 8 may include receiving capability specifications (block 810). For example, an administrator may use administration device 150 to generate a capability record 751 for a new capability and may specify one or more services required to realize the capability. Furthermore, the administrator may specify one or more requirements for each service required to realize the capability.

A service associated with the capability may be selected (block 820) and a subscription request for the selected service may be sent to a service registry (block 830). For example, subscription generator 610 of service manager 600 may select one of the services listed in the capability record 751 and may generate a subscription request for the service (e.g., for the service interface) and may send the subscription request to the nearest service registry 440. In some implementations, service manager 600 and service registry 440 may be running on the same node (e.g., same device 130) in the overlay network and thus service manager 600 may send the subscription request to the local service registry 440. In other implementations, service registry 440 may be located in a different node of the overlay network and the subscription request may be sent via the overlay network.

In some implementations, the subscription request may specify one or more property requirements for the requested service and a service may be identified as a match for the subscription request if the properties of the services match the requirements in the subscription request. In other implementations, the subscription request may identify a requested service (e.g., service interface) and may not include any service property requirements. In such implementations, the service may be identified as a match without considering whether the properties of the service match the requirements and a determination as to whether the service properties satisfy the requirements may be made by service manager 600 based on information included in a received subscription notification.

A subscription notification may be received from the service registry (block 840) and a determination may be made about the deployment availability of the service based on the received subscription notification (block 850). For example, service manager 600 may receive a subscription notification from service registry 440. The subscription notification may include information indicating whether the service is deployed, available for deployment, or not available in the system.

If it is determined that the service is deployed (block 850—SERVICE DEPLOYED), a node may be identified at which the service is deployed (block 860) and the identified node may be associated with the capability (block 862). For example, service manager 600 may retrieve information identifying a node, and/or may retrieve information relating to the properties of the service, from the received subscription notification. If the retrieved properties match the requirements, service manager 600 may associate the identified node with the service in capability record 751.

If it is determined that the service is available for deployment (block 850—SERVICE AVAILABLE FOR DEPLOYMENT), a node at which the service is available for deployment may be identified (block 870), deployment of the service may be initiated at the identified node (block 872) and the identified node may be associated with the capability (block 874). For example, service manager 600 may retrieve information identifying a node, and/or may retrieve information relating to the properties of the service, from the received subscription notification. If the retrieved properties match the requirements, service manager 600 may initiate deployment of the service by sending an instruction to the identified node to deploy the service. For example, service manager 600 may instruct a bundle host at the identified node to deploy the service.

If it is determined that the service is not available (block 850—SERVICE NOT AVAILABLE), an administrator alert may be generated (block 880). For example, alert generator 630 of subscription manager 600 may generate an alert, indicating that the capability cannot be realized because a particular service is not available, and may send the alert to administration device 150. The process of FIG. 8 may be repeated for each service listed in the capability record 751.

Figure 9:
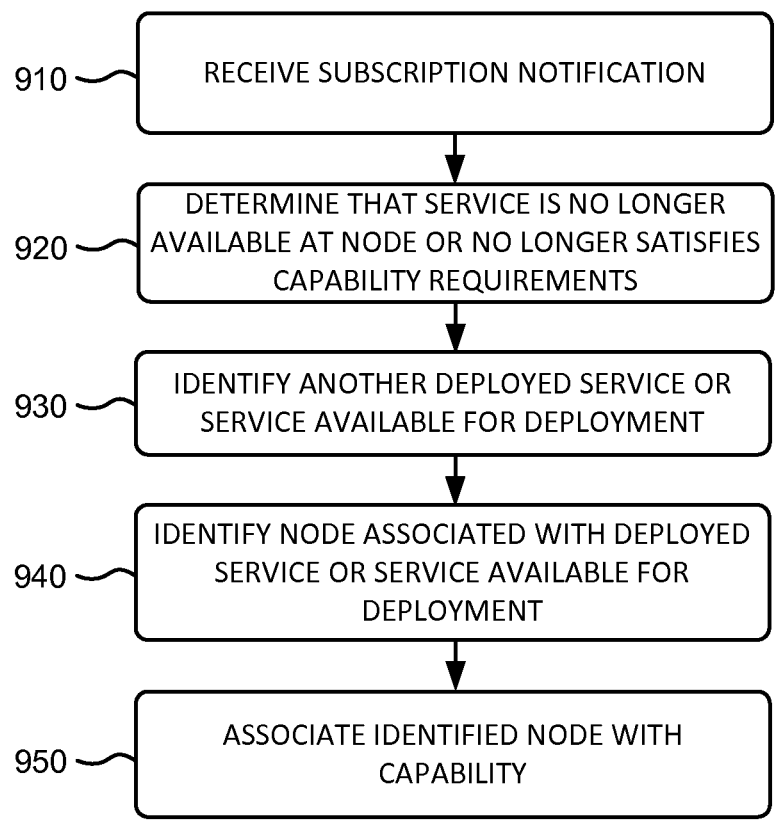
FIG. 9 is a flowchart of a second process for managing a capability according to an implementation described herein.

FIG. 9 is a flowchart of a second process for managing a capability according to an implementation described herein. In one implementation, the process of FIG. 9 may be performed by service manager 600 in device 130. In other implementations, some or all of the process of FIG. 9 may be performed by another device or a group of devices separate from and/or including service manager 600.

The process of FIG. 9 may include receiving a subscription notification (block 910). For example, service manager 600 may receive a subscription notification from service registry 440 relating to a service associated with a capability managed by service manager 600. A determination may be made that the service is no longer available at a node or that the service no longer satisfies the capability requirements (block 920). As an example, service manager 600 may determine that the subscription notification indicates that the service is no longer deployed or available for deployment. As another example, service manager 600 may retrieve information relating to the service properties from the received subscription notification and may determine that the service properties no longer satisfy the service requirements specified in the capability record 751.

Another deployed service or another service available for deployment may be identified (block 930). As service manager 600 sent out a subscription request for the service, service manager 600 may have received subscription notifications from all service registries that include a record of a deployed service instance, or a service instance available for deployment, which matches the specifications of the subscription. Each time service manager 600 receives a subscription notification for a service associated with a capability, service manager 600 may store information from the subscription notification in capabilities DB 640 (e.g., in availability field 774, node field 776, and/or properties field 778). Service manager 600 may access capabilities DB 640 to identify another deployed service instance, or a service instance available for deployment.

In other implementations, in which service manager 600 does not use subscriptions to manage capabilities, or in situations in which service manager 600 has not sent out a subscription request, another deployed service instance, or a service instance available for deployment, may be identified by sending a search query to service registry 440.

A node associated with a deployed service, or service available for deployment, may be identified (block 940) and the identified node may be associated with the capability (block 950). For example, service manager 600 may access node field 776 to identify a node associated with the identified deployed service, or service available for deployment. Service manager 600 may associate the identified node with the service as described above with respect to FIG. 8.

Figure 10:
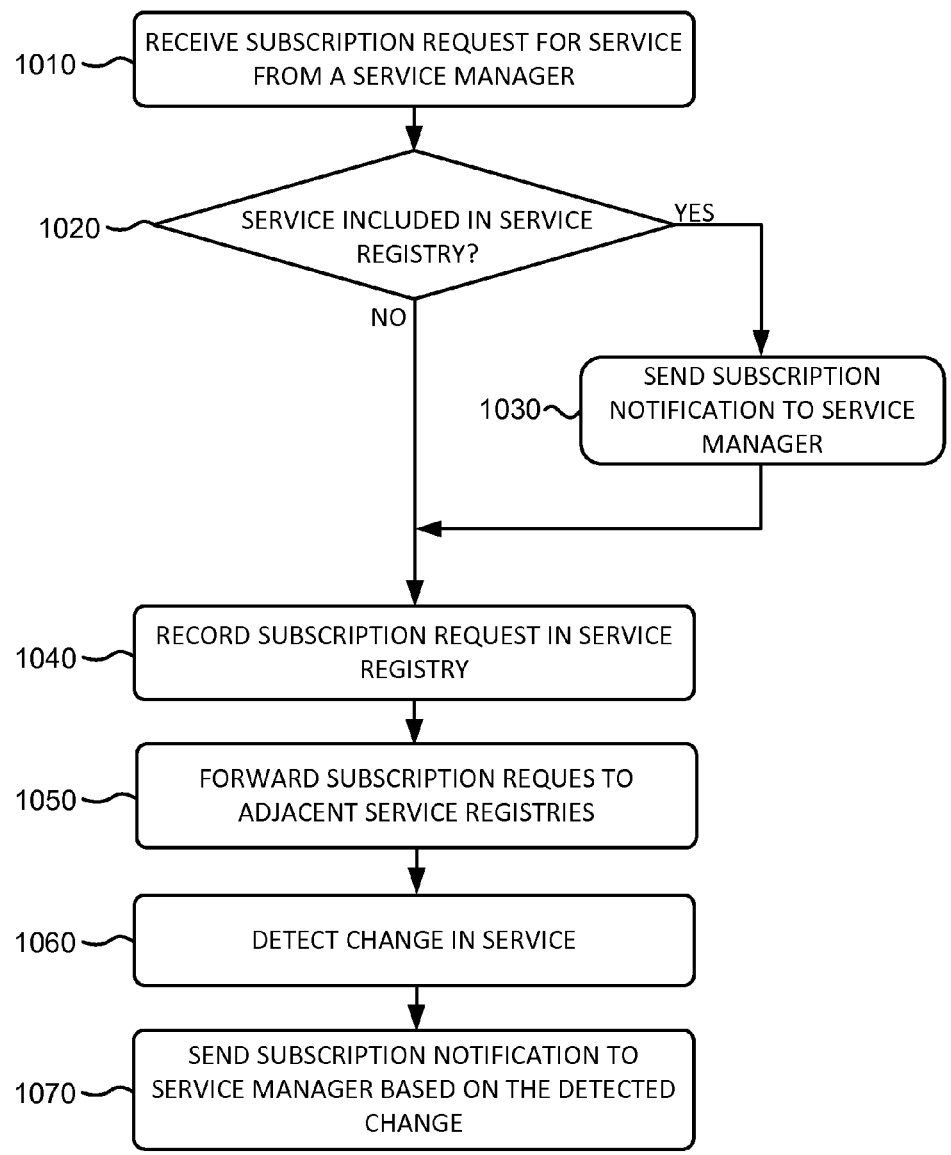
FIG. 10 is a flowchart of a process for managing a subscription request according to an implementation described herein.

FIG. 10 is a flowchart of a process for managing a subscription request according to an implementation described herein. In one implementation, the process of FIG. 10 may be performed by service registry 440 in device 130. In other implementations, some or all of the process of FIG. 10 may be performed by another device or a group of devices separate from and/or including service registry 440.

The process of FIG. 10 may include receiving a subscription request for a service from a service manager (block 1010) and a determination may be made as to whether the service is in the service registry (block 1020). For example, service registry 440 may receive a subscription request from service manager 600 to subscribe to a particular service. Service registry 440 may search service records 701 to determine whether a service in service registry 440 matches the subscription request.

If the service is in the service registry (block 1020—YES), a subscription notification may be sent to the service manager (block 1030). For example, service registry 440 may send a subscription notification to service manager 600 in response to receiving the subscription request and detecting service record 701, to inform service manager 600 that the service is available a particular node, based on information stored in service record 701. Processing may continue to block 1040. If the service is not in the service registry (block 1020—NO), processing may also continue to block 1040.

The subscription request may be recorded in the service registry (block 1040). For example, if the service is included in the service registry, service registry 440 may update service record 701 by including information from the received subscription request in subscription field 718. If the service is not included in the service registry, service registry 440 may need to also record the subscription request, in case the service is later added (so that service manager 600 may be informed that the service was added). In such a case, service registry 440 may create a non-active service record 701 for the service that includes information from the subscription request (e.g., a service record 701 that only includes information in service field 710 and subscription field 718, along with an indication that service record 701 is inactive).

The subscription request may be forwarded to adjacent service registries (block 1050). For example, service registry 440 may identify adjacent service registries, based on the topology of the overlay network, and may forward the subscription request to all adjacent service registries that have not previously processed the request.

At a later time, a change in the service may be detected (block 1060) and a subscription notification may be sent to the service manager based on the detected change (block 1070). For example, service registry 440 may send a subscription notification to service manager 600 in response to any detected change associated with service record 701.

Figure 11:
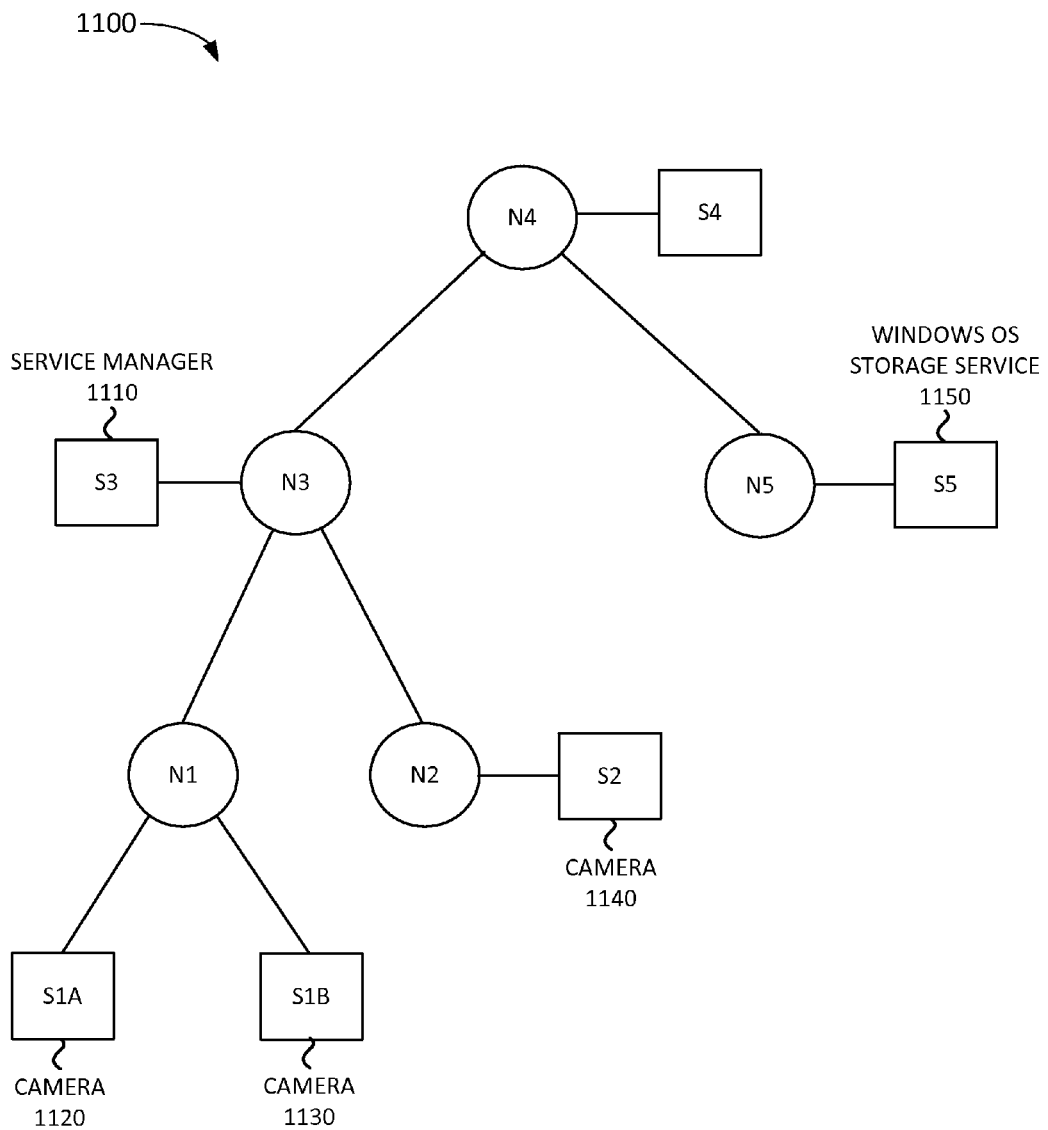
FIG. 11 illustrates an exemplary overlay network in which a capability is realized.

FIG. 11 illustrates an exemplary overlay network 1100 in which a capability is realized. Assume that S3 includes a service manager 1110 which is tasked with realizing a capability for streaming a video signal from a particular location to a Windows OS storage service. The capability requires a first video service to capture a video of a particular location, a second storage service to store the video at a Windows OS server device, and a third service to stream the video signal from the camera to the storage location at a particular bit rate.

Service manager 1110 may generate a subscription request for each of the three services required to realize the capability. Node N1 may identify camera 1120 as satisfying the subscription request for the first video service to capture the video at the location as well as satisfying the subscription request to stream the video signal at the particular bit rate. Camera 1130 may be identified as satisfying the subscription request for the first video service to capture the video at the location, but may not include a service to stream the video at the particular bit rate. Thus, service manager 1110 may select camera 1120 and may associate camera 1120 with the capability. Furthermore, node N5 may identify Window OS storage service 1150 as matching the storage service requirement of the capability.

At a later time, the streaming service of camera 1120 may experience a bit rate that is below the bitrate required by the capability and the service registry at node N1 may send a subscription notification to service manager 1110 at node N3. Service manager 1110 may send out another subscription request and node N2 may respond with a subscription notification that indicates that camera 1140 satisfies the subscription request to stream the video signal at the particular bit rate. Thus, service manager 1110 may associate camera 1140 with the capability. Thus, any client using the capability may experience a shift of the video signal from camera 1120 to camera 1140.

This application incorporates by reference the following applications filed the same date as the present application: Application No. 14/217,978, titled "Finding Services In a Service-Oriented Architecture (SOA) Network"; and Application No. 14/218,601 titled "Tunnel Broker In a Service Oriented Architecture."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 8-10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The word "exemplary" as used herein means "as an example for illustration."

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
a first processor configured to maintain a first service registry, wherein the first service registry includes a first list of services available in a first one or more nodes of the system;
a second processor configured to maintain a second service registry, wherein the second service registry includes a second list of services available in a second one or more nodes of the system, and wherein the second service registry is connected to the first service registry; and a third processor implementing a service manager configured to:
  manage a capability of the system, wherein the capability is realized through a set of one or more services;
  send a subscription request to the first service registry, wherein the subscription request includes an instruction to inform the service manager of changes involving at least one service of the set of one or more services;
  connect to the first service registry;
  receive a notification, from the first service registry, indicating a change in the second list of services included in the second service registry; and
  initiate deployment of a new service for the capability, or locate a deployed instance of the new service in the system, in response to receiving the notification;
wherein the first service registry is further configured to:
  record the subscription request; and
  forward, based on a topology of an overlay network, the subscription request to all adjacent service registries that have not previously processed the subscription request, wherein the adjacent service registries that have not previously processed the subscription request include the second service registry and at least one other service registry; and
wherein the second service registry is further configured to:
  send the notification based on the subscription request.

2. The system of claim 1, wherein the notification includes at least one of:
  an indication that a particular service has been removed from the second service registry;
  an indication that the particular service has been added to the second service registry; or
  an indication that a property, associated with the particular service, has changed.

3. The system of claim 1, wherein the notification is sent in response to a failure detected in at least one of the second one or more nodes of the system.

4. The system of claim 1, wherein the service manager is further configured to:
  determine that the capability cannot be fully realized, in response to receiving the notification; and
  send an alert to an administrator, in response to determining that the capability cannot be fully realized.

5. The system of claim 1, wherein the service manager is further configured to:
  locate the deployed instance of the new service available in the system; and
  associated the located deployed instance with the capability, in response to locating the deployed instance of the new service in the system.

6. The system of claim 1, wherein the service manager is further configured to:
  determine that no deployed instances of the new service are available in the system; and
  initiate deployment for the new service for the capability, in response to determining that no deployed instances of the new service are available in the system.

7. The system of claim 1, wherein the service manager is further configured to:
  receive, from a client, a request for the capability;
  determine that a particular one of the set of one or more services, through which the capability is realized, is not deployed in the system;
  select a deploying node based on information obtained from at least one of the first service registry or the second service registry; and
  instruct the selected deploying node to deploy the particular one of the set of one or more services, based on the received request.

8. The system of claim 1, wherein, when initiating deployment of the new service for the managed capability, the service manager is further configured to:
  determine that the change in the second list of services included in the second service registry corresponds to at least one of the set of one or more services not being deployed;
  identify a particular node in which the at least one of the set of one or more services is available; and
  instruct the identified node to deploy the at least one of the set of one or more services in the particular node.

9. A method comprising:
  maintaining, by a first service registry device that includes a first service registry, a first list of services available in a first one or more nodes of the system;
  maintaining, by a second service registry device that includes a second service registry, a second list of services available in a second one or more nodes of the system, wherein the second service registry is connected to the first service registry;
  managing, by a service manager device, a capability of the system, wherein the capability is realized though a list of services;
  connecting, by the service manager device, to the first service registry device;
  sending, by the service manager device, a subscription request to the first service registry device, wherein the subscription request includes an instruction to inform the service manager device of changes involving at least one service of the list of services;
  recording, by the first service registry device, the subscription request;
  forwarding, by the first service registry device and based on a topology of an overlay network, the subscription request to all adjacent service registries that have not previously processed the subscription request, wherein the adjacent service registries that have not previously processed the subscription request include the second service registry and at least one other service registry;
  sending, by the second service registry device and to the first registry device, a notification indicating a change in the second list of services based on the subscription request;
  receiving, by the service manager device and from the first service registry device, the notification; and
  initiating, by the service manager device, deployment of a new service for the capability, or locating a deployed instance of the new service in the system, in response to receiving the notification.

10. The method of claim 9, wherein the notification includes an indication that the service is available for deployment at a first node associated with the second service registry, and wherein the method further comprises:
  initiating the deployment of the service at the first node in response to receiving notification.

11. The method of claim 9, wherein the notification includes an indication that the service is deployed in the system, and wherein the method further comprises:
  locating the deployed instance of the service in the system, in response to receiving the notification.

12. The method of claim 9, further comprising:
receiving another notification, associated with the new service, from the second service registry via the first service registry, wherein the other notification includes an indication that the service is no longer available at a first node associated with the second service registry;
identifying a second node at which the service is available for deployment; and
initiating deployment of the service at the second node, in response to identifying the second node.

13. The method of claim 9, further comprising:
receiving another notification, associated with the service, from the second service registry via the first service registry, wherein the other service notification includes an indication that the new service is no longer available for deployment at a first node associated with the second service registry;
determining that the service is not available for deployment at any other node in the system; and
sending an alert to an administrator, in response to determining that the service is not available for deployment at any other node in the system.

14. The method of claim 9, further comprising:
receiving another service notification, associated with the service, from the second service registry via the first service registry, wherein the other notification includes an indication that a property associated with the service has changed;
determining that the service no longer satisfies a requirement associated with the capability;
ending the deployment of the service at a first node, in response to determining that the service no longer satisfies the requirement;
identifying a second node at which the service is available for deployment; and
initiating deployment of the service at the second node, in response to identifying the second node.

15. The method of claim 14, wherein the property associated with the service includes at least one of:
an available memory capacity;
a processing capacity of the first node at which the service is deployed;
a location of the first node;
a coverage of the first node;
an environmental condition associated with the first node; or
a measure of signal quality associated with the first node.

16. The method of claim 9, further comprising:
receiving, from a requesting node in the system, a request for a particular service;
determining that the particular service is not deployed in the system;
selecting a deploying node based on at least one of the first service registry device or the second service registry device; and
deploying the particular service in the selected deploying node, based on the received request.

17. The system of claim 2, wherein the service manager is further configured to:
determine that the capability cannot be fully realized, in response to receiving the notification; and
send an alert to an administrator, in response to determining that the capability cannot be fully realized.

18. The system of claim 2, wherein the service manager is further configured to:
determine that no deployed instances of the new service are available in the system; and
initiate deployment for the new service for the capability, in response to determining that no deployed instances of the new service are available in the system.

19. The system of claim 18, wherein, when initiating deployment of the new service for the managed capability, the service manager is further configured to:
determine that the change in the second list of services included in the second service registry corresponds to at least one of the set of one or more services not being deployed;
identify a particular node in which the at least one of the set of one or more services is available; and
instruct the identified node to deploy the at least one of the set of one or more services in the particular node.

20. The method of claim 10, further comprising:
receiving another notification, associated with the new service, from the second service registry via the first service registry, wherein the other notification includes an indication that the service is no longer available at a first node associated with the second service registry;
identifying a second node at which the service is available for deployment; and
initiating deployment of the service at the second node, in response to identifying the second node.

* * * * *